United States Patent [19]

Canzek

[11] Patent Number: 4,621,904
[45] Date of Patent: Nov. 11, 1986

[54] MAGNIFIER LENS SYSTEM

[76] Inventor: Ludvik Canzek, Quellmattstrasse 3, 5035 Unterentfelden, Switzerland

[21] Appl. No.: 648,294

[22] Filed: Sep. 7, 1984

[30] Foreign Application Priority Data

Sep. 19, 1983 [CH] Switzerland ............. 5062/83

[51] Int. Cl.$^4$ ............. G02B 25/00; G02B 9/34
[52] U.S. Cl. ............. 350/410; 350/472
[58] Field of Search ............. 350/410, 467, 472

[56] References Cited

U.S. PATENT DOCUMENTS

| 2,363,712 | 11/1944 | Warmisham et al. | 350/467 |
| 3,888,567 | 6/1975 | Shoemaker | 350/410 |
| 4,286,844 | 9/1981 | Nagler | 350/410 |

FOREIGN PATENT DOCUMENTS

| 29005 | 11/1980 | European Pat. Off. |
| 2708691 | 9/1977 | Fed. Rep. of Germany |

Primary Examiner—John K. Corbin
Assistant Examiner—Scott J. Sugarman
Attorney, Agent, or Firm—Werner W. Kleeman

[57] ABSTRACT

A magnifier lens has a focal length f and a distance of at least 0.58f between the exit pupil (EXP) and the last lens ($L_5$) vertex. This magnifier lens comprises, successively from the object-side to the eye-side, a lens, such as a meniscus lens ($L_1$) with its concave side facing the object, a positive lens ($L_2$) and a negative lens ($L_3$) as well as a meniscus lens ($L_4$) and a positive lens ($L_5$), defining the last lens, separated by an air space ($d_7$). The meniscus lens ($L_4$) faces the eye with its concave side. The use of thin lenses permits a short overall length of a preferred embodiment of only 1.27f, and a sum of the lens thicknesses of 0.89f. Three large lenses ($L_2$, $L_3$, $L_4$) may be made of so-called light-weight glass (SKL15 and SFL11) instead of regular glass. This results in a handy magnifier of short length and low weight with low cost of manufacture due to the small number of lens elements. A good state of correction is evidenced by a distortion of under 3 percent for a semi-field angle of 20°. The magnifier lens is particularly well suited for use in optoelectronics, i.e. for observation of the image on the anode screen of an electronic tube.

4 Claims, 1 Drawing Figure

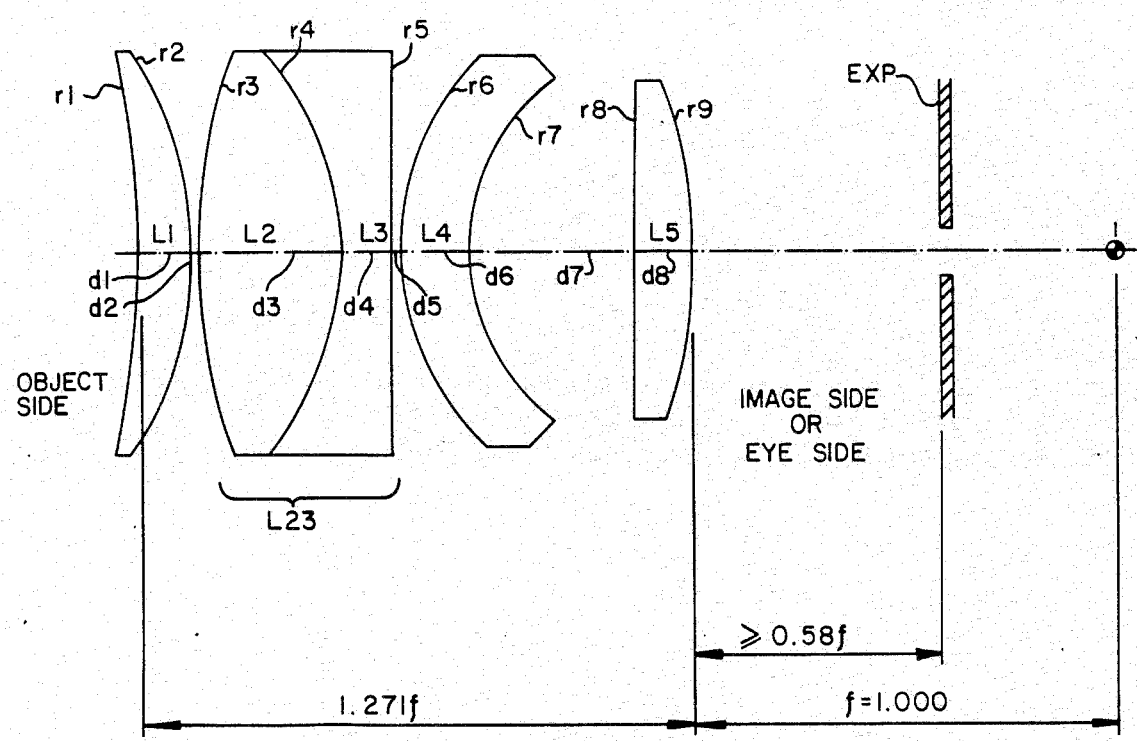

MAGNIFIER LENS SYSTEM

BACKGROUND OF THE INVENTION

The present invention broadly relates to a magnifier lens system and, more particularly, pertains to a new and improved construction of a magnifier lens for use in optoelectronic devices.

Magnifier lenses of this type are known in the art for observing the image on the anode surface of an electronic tube. These magnifiers must have both a very good image quality and a short overall length. This is because the electronic tubes are predominantly employed in portable optoelectronic devices, e.g. observation telescopes or gun sights for low light level or heat image applications.

A magnifier lens is known from German Patent Publication No. 2,708,691, published Sept. 8, 1977, which consists of only five lenses and has an exit pupil with a distance greater than 0.58f from the last lens vertex, f being the system focal length. These magnifiers suffer from an exceptionally great overall length of 2.53f and a sum of the thicknesses of the lens elements of more than 2.2f. Moreover, the glasses employed have specific gravities of 3.78 g/cm$^3$ or more. Apart from the resulting considerable weight and poor handling properties, such magnifiers are also rather costly to fabricate.

A magnifier lens is known from the European Patent application No. 29,005, published May 20, 1981, which has a shorter overall length of 1.5f and a sum of the lens thicknesses of 1.3f. However, this magnifier system consists of six lens elements. Its main disadvantage is a rather short distance of the exit pupil from the last lens vertex of only 0.57f. This is the reason why the magnifier cannot be made with a short focal length and why it cannot be used for devices mounted on a firearm. Moreover, this magnifier system has a rather substantial distortion of 10.8 percent at a field angle of 24.6°.

From the above examples of the state of the art it may be seen that a short overall length entails a short distance of the exit pupil from the last lens vertex. A magnifier of simple construction having a short overall length, a great distance of the exit pupil and a good correction of distortion is not known in the art.

If one tries to modify known magnifier systems in order to shorten the overall length, the distance of the exit pupil is reduced at the same time and the distortion increases. This fact is demonstrated by the above-mentioned known examples:

| Example | Overall length | Distance of Exit Pupil | Distortion at 20° |
| --- | --- | --- | --- |
| German Patent Publication No. 2,708,691 | 2.53 f | 1.33 f | approx. 5% |
| European Patent Application No. 29,005 | 1.5 f | 0.57 f | more than 8% |

As already mentioned, the reduction in overall length of the system according to the aforementioned European Patent Application No. 29,005 not only brings about a shortened distance of the exit pupil from the last lens vertex and an increased distortion, but the system also has one additional lens element.

SUMMARY OF THE INVENTION

Therefore, with the foregoing in mind, it is a primary object of the present invention to provide a new and improved construction of a magnifier lens system which does not exhibit the aforementioned drawbacks and shortcomings of the prior art constructions.

It is a further object of the present invention to provide a magnifier lens system which has a short overall length and a moderate sum of the thicknesses of all lens elements, the system having at the same time a great distance of the exit pupil and good image forming properties.

Now in order to implement these and still further objects of the invention, which will become more readily apparent as the description proceeds, the magnifier lens system of the present invention is manifested by the features that, there is provided a magnifier lens system having a focal length f, an exit pupil with a distance from the last lens vertex of at least 0.58f and an object-side lens, a central lens group and a lens group on the eye-side, wherein the object-side lens may comprise a meniscus or meniscus lens with its concave side facing the object. The central lens group comprises a positive lens and a negative lens and the lens group on the eye-side comprises a meniscus or meniscus lens and a positive lens separated by an air space. The meniscus lens of the lens group on the eye side faces the eye with its concave side and the thickness of the lens, such as the meniscus lens on the object side is in accord with the relation $d_1 \leq 0.45f$, f being the system focal length.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE is an optical diagram of a magnifier lens system according to the invention.

DETAILED DESCRIPTION OF THE PREFERRED EMBODIMENTS

Describing now the drawings, it is to be understood that, in order to simplify the showing thereof, only enough of the structure of the magnifier lens system has been illustrated therein as is necessary to enable one skilled in the art to readily understand the underlying principles and concepts of this invention. Turning now specifically to the drawing, the embodiment of the magnifier lens system illustrated therein by way of example and not limitation will be seen to have the following specifications:

| | Radius | Thickness | Glass |
| --- | --- | --- | --- |
| $L_1$ | $r1 = -2.036$ | $d_1 = 0.131$ | LaFN21 |
| | $r2 = -0.860$ | $d_2 = 0.004$ | |
| $L_2$ | $r3 = 1.453$ | $d_3 = 0.331$ | SK15 (SKL15) |
| $L_3$ | $r4 = -0.697$ | $d_4 = 0.114$ | SF11 (SFL11) |
| | $r5 = 11.079$ | $d_5 = 0.004$ | |
| $L_4$ | $r6 = 0.617$ | $d_6 = 0.168$ | SF11 (SFL11) |
| | $r7 = 0.533$ | $d_7 = 0.376$ | |
| $L_5$ | $r8 = 15.576$ | $d_8 = 0.143$ | LaFN21 |
| | $r9 = -1.184$ | | |
| | | $f = 1.000$ | | wherein f designates the system focal length.

As the above specifications or numerical data show, the overall length of the system is 1.271f, the sum of the lens thicknesses is 0.887f and the thickness $d_1$ of the lens, such as the meniscus lens $L_1$ on the object side is only 0.131 f. The regular glasses of the large lenses ($L_2$, $L_3$, $L_4$) may be replaced by substantially lighter glasses without any change in the numerical data. This can result in a further considerable reduction of weight. Moreover, this magnifier has a simple construction. It consists of only five lens elements and elements $L_2$ and $L_3$ may be cemented into a lens unit $L_{23}$.

From optical calculations a very good state of correction is evident. If the exit pupil (EXP) is placed more than 0.58f behind the last vertex, the distortion at a semi-field angle of 20° is about 6 percent. With a system setting for a divergent bundle on the eye side, distortion may be reduced below 3 percent if at the same time the curved face of a fiber lens is used as an object.

While there are shown and described present preferred embodiments of the invention, it is to be distinctly understood that the invention is not limited thereto, but may be otherwise variously embodied and practiced within the scope of the following claims.

Accordingly, what I claim is:

1. A magnifier lens system having a focal length f and an exit pupil with a distance from a last lens vertex of at least 0.58f, comprising:
    a positive object-side lens;
    a central lens group;
    a lens group on the eye-side;
    said central lens group being positive and including a cemented positive lens and a negative lens;
    said lens group on the eye-side including a meniscus lens having a concave side and a positive lens separated by an air space;
    said meniscus lens facing the eye with said concave side thereof; and
    a thickness of said object side lens being in accord with the relation:

$d_1 \leq 0.45f$, wherein $d_1$ is said thickness and f is said focal length.

2. The magnifier lens system as defined in claim 1, wherein:
    the sum of the thicknesses of said object-side lens, of said positive lens and said negative lens of said central lens group and of said meniscus lens and said positive lens of said lens group on the eye-side is in accord with the relation:

$s \leq 1.29f$, wherein s is said sum of the thicknesses and f is said focal length.

3. The magnifier lens system as defined in claim 1, wherein:
    said object side lens has a first radius of curvature;
    said object side lens having a second radius of curvature; and
    said first and second radii being in accord with the relations:

$|r1| \geq 0.35f$, $|r2| \geq 0.35f$, wherein r1 is said first radius of curvature and r2 is said second radius of curvature.

4. A magnifier lens system having a focal length f and an exit pupil with a distance from a last lens vertex of at least 0.58f, comprising:
    an object-side lens;
    a central lens group;
    a lens group on the eye-side;
    said object-side lens comprising a meniscus lens having a concave side facing the object;
    said central lens group including a positive lens and a negative lens;
    said lens group on the eye-side including a meniscus lens and a positive lens separated by an air space; and
    said meniscus lens of said object-side lens, said positive lens and said negative lens of said central lens group and said meniscus lens and said positive lens of said lens group on the eye-side having the following numerical values:

|       | Radius      | Thickness    | Glass        |
|-------|-------------|--------------|--------------|
| $L_1$ | r1 = −2.036 | $d_1$ = 0.131 | LaFn21       |
|       | r2 = −0.860 | $d_2$ = 0.004 |              |
| $L_2$ | r3 = 1.453  | $d_3$ = 0.331 | SK15 (SKL15) |
| $L_3$ | r4 = −0.697 | $d_4$ = 0.114 | SF11 (SFL11) |
|       | r5 = 11.079 | $d_5$ = 0.004 |              |
| $L_4$ | r6 = 0.617  | $d_6$ = 0.168 | SF11 (SFL11) |
|       | r7 = 0.533  | $d_7$ = 0.376 |              |
| $L_5$ | r8 = 15.576 | $d_8$ = 0.143 | LaFN21       |
|       | r9 = −1.184 |              |              | wherein:
$L_1$ is said meniscus lens of said object-side lens;
$L_2$ is said positive lens of said central lens group;
$L_3$ is said negative lens of said central lens group;
$L_4$ is said meniscus lens of said lens group on the eye-side;
$L_5$ is said positive lens of said lens group on the eye-side;
r1 is the radius of a first side of $L_1$;
r2 is the radius of a second side of $L_1$;
r3 is the radius of a first side of $L_2$;
r4 is the radius of a second side of $L_2$ as well as of a first side of $L_3$;
r5 is the radius of a second side of $L_3$;
r6 is the radius of a first side of $L_4$;
r7 is the radius of a second side of $L_4$;
r8 is the radius of a first side of $L_5$;
r9 is the radius of a second side of $L_5$;
$d_1$ is the thickness of $L_1$;
$d_2$ is the spacing between $L_1$ and $L_2$;
$d_3$ is the thickness of $L_2$;
$d_4$ is the thickness of $L_3$;
$d_5$ is the spacing between $L_3$ and $L_4$;
$d_6$ is the thickness of $L_4$;
$d_7$ is the spacing between $L_4$ and $L_5$;
$d_8$ is the thickness of $L_5$; and
f is said focal length.

* * * * *